United States Patent [19]

Keriakos et al.

[11] Patent Number: 4,532,384
[45] Date of Patent: Jul. 30, 1985

[54] LINE FEED CIRCUIT INCLUDING NEGATIVE IMPEDANCE CIRCUIT

[75] Inventors: Magdy H. Keriakos, Kanata; Stanley D. Rosenbaum, Ottawa, both of Canada

[73] Assignee: Northern Telecom Limited, Montreal, Canada

[21] Appl. No.: 464,032

[22] Filed: Feb. 4, 1983

[51] Int. Cl.³ .............................................. H04B 3/16
[52] U.S. Cl. ................................ 179/170 G; 179/77; 333/216; 333/217
[58] Field of Search .......... 179/70, 77, 170 G, 18 FA, 179/16 AA, 170 R, 16 F, 170 D; 333/216, 217

[56] References Cited
U.S. PATENT DOCUMENTS 3,927,280 12/1975 Gupta et al. .................... 179/170 G
3,955,052 5/1976 Orbach ............................. 179/18 FA
4,135,064 1/1979 Lichtenstein ..................... 179/170 G
4,197,431 4/1980 Vis ........................................ 179/70
4,350,964 9/1982 Chambers, Jr. ..................... 333/216

Primary Examiner—Gene Z. Rubinson
Assistant Examiner—R. Vaas
Attorney, Agent, or Firm—J. E. Moorehouse

[57] ABSTRACT

Communication lines for example telephone loop circuits are typically terminated with line feed circuits such that d.c. and a.c. terminating impedances are dissimilar. The line feed circuit includes tip and ring feed resistors of similar ohmic values for supplying the communication line with energizing current. An a.c. terminating impedance of greater ohmic value than the d.c. terminating resistance is provided by a negative impedance circuit which is a.c. coupled across the communication line, in shunt with the feed resistors.

12 Claims, 13 Drawing Figures

LINE FEED CIRCUIT INCLUDING NEGATIVE IMPEDANCE CIRCUIT

The invention relates to line interface apparatus for coupling a communication line with a communication system. More particularly, the invention is a line circuit having positive feed resistances in combination with a negative impedance circuit.

Telephone loops which are associated with a central office (CO) telephone facility are usually terminated at the CO by a line circuit. The line circuit is typically required to provide a terminating impedance of about 900 ohms for voice frequency signals on the loop. The line circuit is also required to supply energizing direct current for operation of the loop. This is typically arranged for by two similar resistors of about 200 ohms, each being connected in series with one of the tip and ring leads of the loop and a CO battery of about 50 volts. Usually, it is not permissible to employ resistors of values greatly exceeding 200 ohms, because, typically, the energizing current is required to be not less than about 20 milliamperes for CO loops having resistances up to about 2000 ohms, including the resistance of an OFF HOOK telephone set. Thus the source impedance of the energizing current is usually close to 400 ohms, significantly lower than the required a.c. impedance of 900 ohms. Therefore, separate circuits or devices are usually required to meet both the a.c. terminating impedance and the d.c. energizing current requirements. The line circuit usually must meet stringent requirements as to permissible levels of unbalance to ground, for example less than −60 decibels, and tolerance of longitudinal induction of up to 20 milliamperes rms per lead. The line circuit must also be able to survive high voltage surges of at least 500 volts without damage to itself or apparatus in the CO. All of these requirements are well satisfied by many prior line interface circuits, which typically include a transformer for coupling a.c. signals between the loop and the CO. The transformer usually includes tip and ring windings being connected in series with respective tip and ring feed resistors and may include a d.c. flux cancellation winding as for example is disclosed by V. V. Korsky in U.S. Pat. No. 4,103,112 issued on July 25, 1978, whereby the size and cost of the transformer is reduced. Many newer line circuits of intended lesser cost have been developed through reducing bulk of various circuit components and by utilizing newer devices including semiconductor components to replace the transformer. Many of these newer developments in line circuits have not been without penalties such as requirements for battery voltage boosters, or failure to meet all of the typical line interface circuit operational requirements, or are not yet cost competitive with present widely used line interface circuits.

A line circuit in accordance with the invention includes tip and ring feed resistances for connection in series between a source of energizing power and tip and ring leads of a communication line whereby the sum of the ohmic values of the tip and ring feed resistances substantially determines an energizing current feed resistance for the communication line. An a.c. negative impedance circuit is connected across the tip and ring terminals and provides in combination with the feed resistance, an a.c. termination impedance for the communication line. In one example an energizing current feed resistance of 400 ohms in parallel with an a.c. impedance of −720 ohms provides an a.c. terminating impedance of about 900 ohms for voice frequency signals on the communication line. A suitable negative impedance circuit includes both passive and active circuit devices. The negative impedance is preferably coupled to the communication line through a transformer having a winding which is a.c. coupled across the tip and ring terminals. Transformer coupling has been found to be advantageous in that the negative impedance is substantially isolated from the communication line at very low frequencies approaching d.c. and balanced impedances between the tip and ring leads to ground are inherent, providing the tip and ring feed resistances are matched to each other. Furthermore, a blocking capacitor in series with the winding prevents high or steady state currents from flowing in the transformer windings. This is one factor in providing an economical miniature transformer in the line circuit.

The invention provides a line feed circuit for terminating a two wire communication line with a predetermined d.c. feed resistance and with a predetermined a.c. impedance at a frequency in a voice band of frequencies. The line circuit includes tip and ring terminals for connection to the communication line and first and second power terminals for connection to a source of energizing power. Tip and ring resistors are connected between respective ones of the tip and ring terminals and the first and second power terminals. The tip and ring resistor are of similar ohmic values and in summation provide the predetermined d.c. feed resistance. A transformer includes first and second windings in combination with a core structure. A capacitor is connected in series with the first winding across the tip and ring terminals to provide an inductive capacitive series circuit being resonant at a frequency below the voice band of frequencies. A negative impedance coupling circuit is connected at an end of the second winding for coupling a.c. signals to the communication line via the first and second windings and whereby said predetermined a.c. terminating impedance is effected across the tip and ring terminals.

An example embodiment of a line feed circuit and the design and structure of two examples of negative impedance circuits for the line feed circuit are discussed with reference to the accompanying drawings in which.

Figure 1:
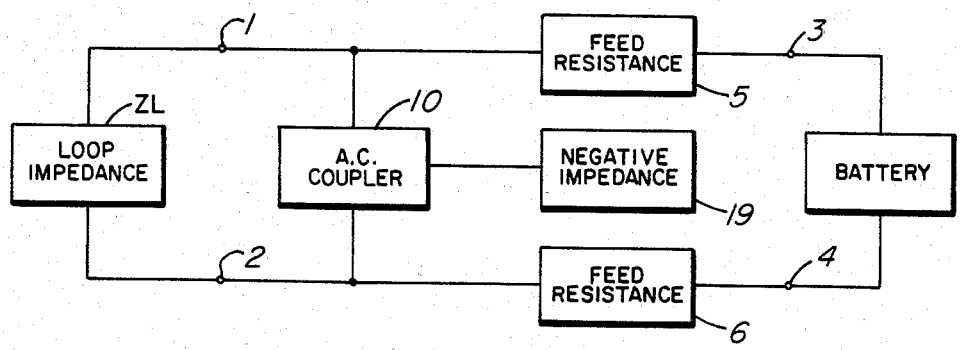
FIG. 1 is a block schematic diagram of a general form of a line feed circuit in accordance with the invention.

The general form of the line feed circuit illustrated in FIG. 1 includes a tip terminal 1 and a ring terminal 2 being connected to a communication line, typically a telephone subscriber loop having a loop impedance ZL. The loop impedance ZL represents a loop impedance value of tip and ring conductors in series with a typical telephone station set being in an OFF HOOK state of operation. Power terminals 3 and 4 are connected across a source of direct current labelled BATTERY such that an energizing loop current is supplied to the loop impedance ZL via feed resistances 5 and 6. The ohmic values of the feed resistances are typically about 200 ohms each and are sufficiently matched to achieve in operation, at least a minimum predetermined common mode rejection value. An a.c. coupler 10 is connected across the tip and ring terminals 1 and 2 and includes a port connected to a negative impedance circuit 19. Hence an effective feed resistance measured at the tip and ring terminals is the sum of the values of the feed resistances 5 and 6. However an effective feed impedance in the voice band range of frequencies is a result of the feed resistance taken in shunt with the ohmic value of the negative impedance circuit 19. Thus in one example a desired feed impedance of about 900 ohms is obtained with −720 ohms in shunt with 400 ohms.

Figure 5:
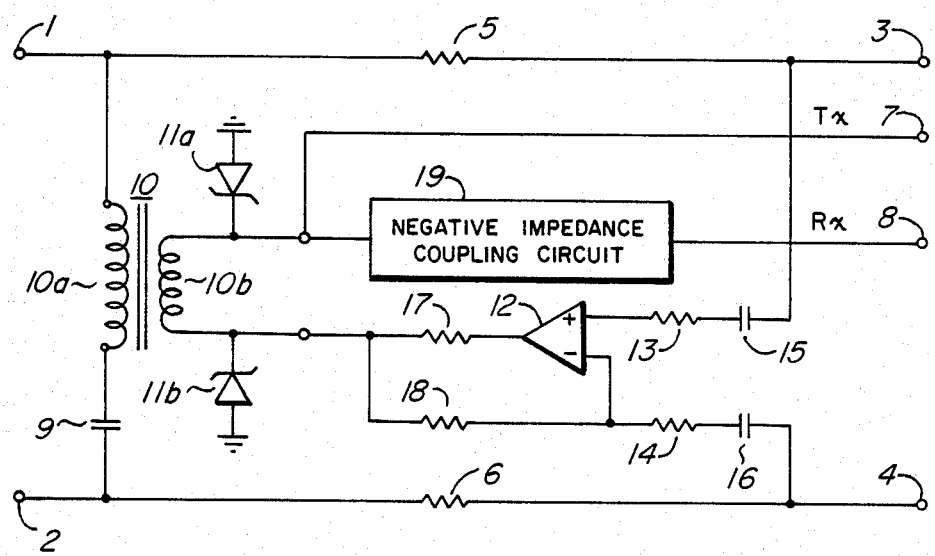
FIG. 5 is a more detailed schematic diagram of a line feed circuit similar to the line feed circuit illustrated in FIG. 1 and in accordance with the invention.

Referring briefly to FIG. 5 a preferred example of the a.c. coupler 10 is illustrated and includes a transformer having a primary winding 10a being connected in series with a capacitor 9 between the tip and ring terminals 1 and 2. The previously referred to port is provided by a secondary winding 10b. In this arrangement, there are two basic problems which make it difficult to achieve a commercially acceptable design of the line feed circuit. Firstly if the negative impedance 19 is assumed to be a simple −720 ohm resistance at voice frequencies, the inductance of the transformer winding 10a and the capacitance of the capacitor 9 must be of such high values that the bulk of these two components would render the line circuit too costly. Therefore, a simple −720 ohm resistance at voice frequencies would not be a suitable form of the negative impedance 19 in FIG. 5. Secondly, it is well known that circuits containing negative impedance elements tend to be unstable, such instability usually being demonstrated by either of undesirable circuit oscillation or d.c. latch up. Occurrence of either of these instability functions of course negates the intended negative impedance functions of the negative impedance element.

Basic principles for designs of negative impedance circuits which are adapted to avoid these two basic problems are discussed with reference to FIGS. 2a–2f.

Figure 2A:
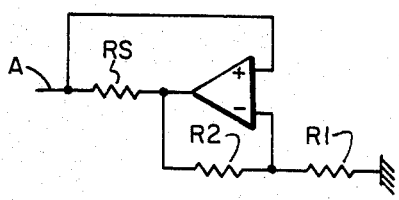
FIGS. 2a–2f are schematic diagrams of negative impedance circuit units useful for illustrating design methods for defining impedance functions required in a negative impedance circuit used in FIG. 1.

It is known that a negative resistance is created by a circuit as illustrated in FIG. 2a. The circuit includes an operational amplifier and resistors R1, R2 and RS. Typically resistors R1 and R2 each have a much higher ohmic value than that of the resistor RS. In such a case an impedance Ri as between a point A and ground in FIG. 2a is approximately as defined by the following equation:

$$Ri = -RS\, R1/R2 \qquad (1)$$

Figure 2B:
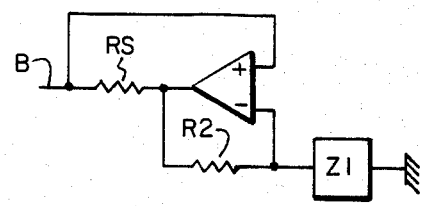

Complex impedances with negative elements are created by a circuit as illustrated in FIG. 2b, where in contrast to the circuit in FIG. 2a the resistor R1 is replaced by an impedance Z1. An impedance between a point B and ground is approximately as defined by the following equation:

$$Zi = -RS\, Z1/R2 \qquad (2)$$

Figure 2C:
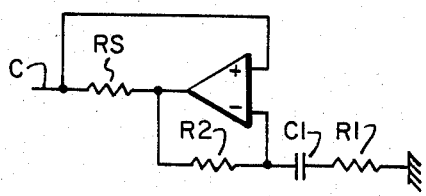

FIG. 2c illustrates a specific example wherein the impedance Z1 in FIG. 2b is provided by a capacitor C1 connected in series with the resistor R1. In this example, a resulting impedance between a point C and ground is substantially defined by the negative resistance Ri from equation (1), taken in series with a negative capacitance Ci as approximately defined by the following equation:

$$Ci = -C1\, R2/RS \qquad (3)$$

Figure 2D:
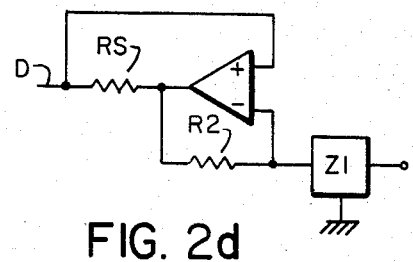
Figure 2E:
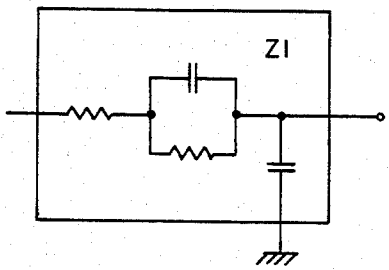
Figure 2F:
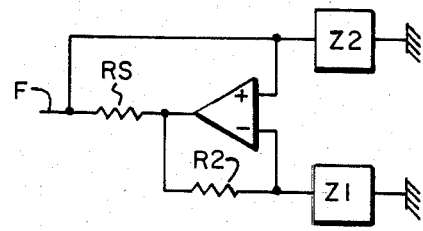

As a matter of review, it is well known that a negative capacitance is similar to an inductance in that a current component lags a voltage component of an applied alternating signal. However the negative capacitance differs in that a magnitude of impedance (voltage to current ratio) varies in direct proportion with frequency for an inductance but varies in inverse proportion for a capacitance, whether or not the capacitance is negative or positive. In FIG. 2d a circuit similar to the circuit in FIG. 2b is illustrated, however in contrast to FIG. 2b the impedance Z1 is a three terminal impedance for example similar to a resistor capacitor network illustrated in FIG. 2e. Another negative impedance circuit including two complex impedances Z1 and Z2, is illustrated in FIG. 2f. In the circuit of FIG. 2f an impedance between a point F and ground is approximately defined by the following equation:

$$Zi = 1/[Z2 - R2/RS\, Z1)] \qquad (4)$$

The circuit units illustrated in FIGS. 2a–2f are selectively used as building blocks to achieve a desired complex negative impedance function in conjunction with other circuit elements.

Figure 3:
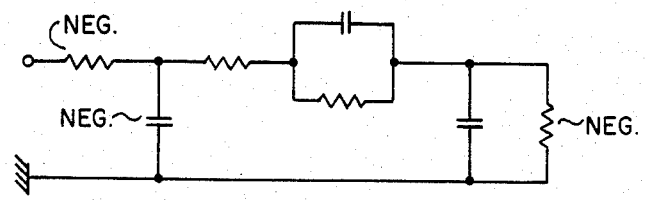
FIG. 3 is a schematic diagram of one example of a conceptual form of a negative impedance network useful in a line feed circuit as illustrated in FIG. 1.
Figure 4:
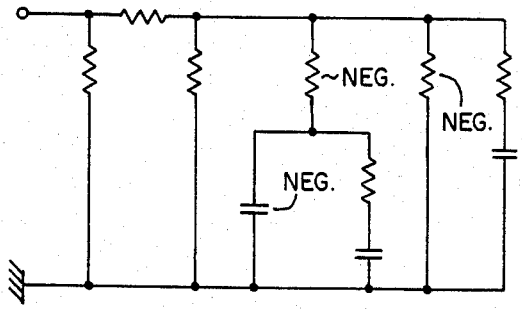
FIG. 4 is a schematic diagram of another example of a conceptual form of a negative impedance network useful in a line feed circuit as illustrated in FIG. 1.

Negative impedance circuits useful in line feed circuits similar to that illustrated in FIG. 5 are illustrated in conceptual forms in FIGS. 3 and 4. These negative impedance circuits are represented by passive resistor and capacitor circuit elements some of which are indicated to be negative characteristic functioning components by an associated label NEG.

Figure 6:
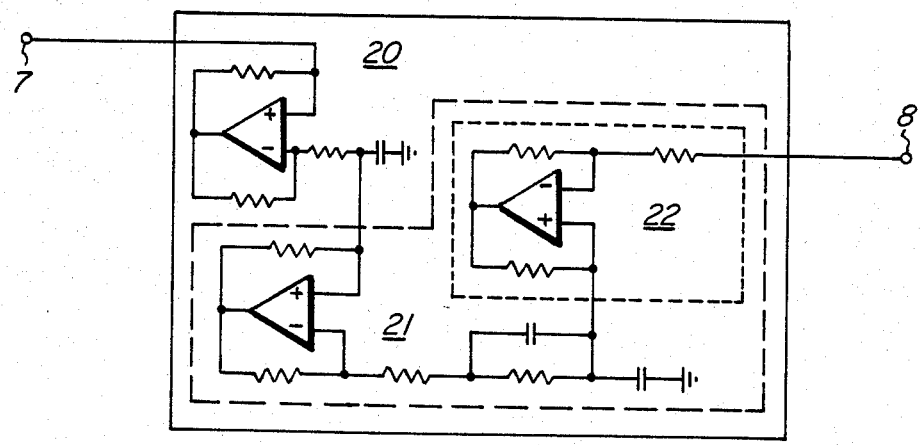
FIG. 6 is a schematic diagram of a negative impedance coupling circuit useful in the line feed circuit illustrated in FIG. 5, and in accordance with the conceptual form illustrated in FIG. 3.
Figure 7:
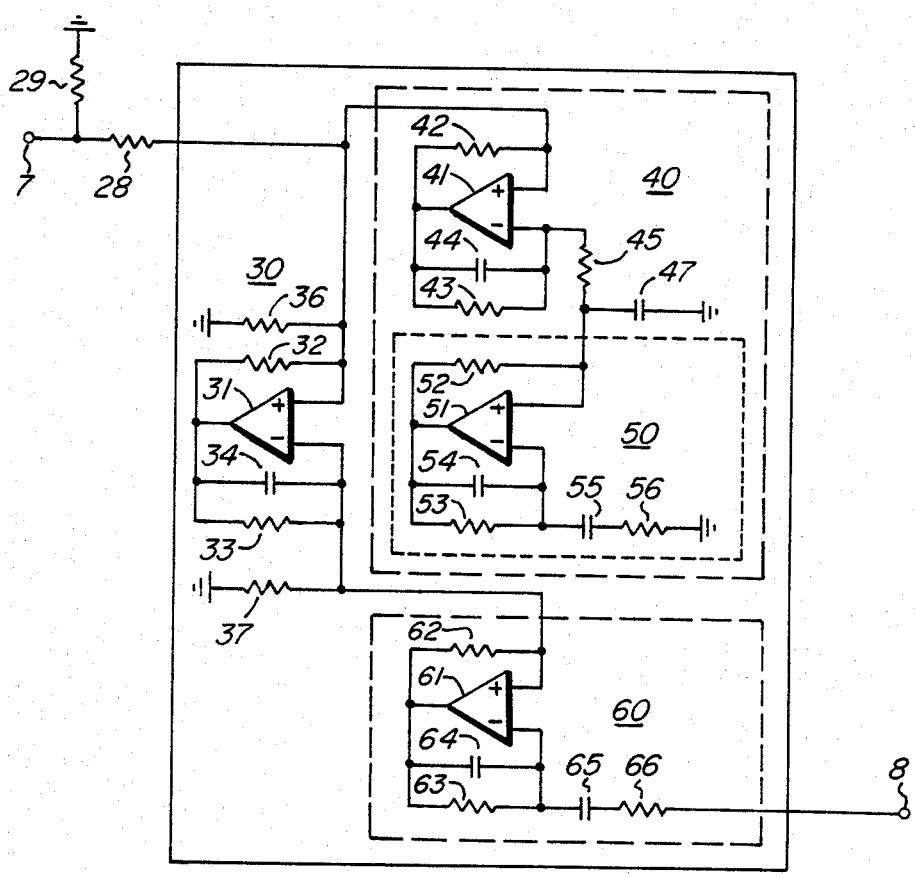
FIG. 7 is a schematic diagram of a negative impedance coupling circuit useful in the line feed circuit illustrated in FIG. 5, and in accordance with the conceptual form illustrated in FIG. 4.

These conceptual forms were derived by combining known methods of circuit analysis, synthesis, and stability testing followed by numerical trial and error methods implemented by means of computer simulation. The negative elements have been realized in practical form by using the circuit units as described in relation to FIGS. 2a–2f. The practical realizations are illustrated in FIGS. 6 and 7. The negative impedance coupling circuit in FIG. 6 is exemplary of a practical realization of the conceptual form illustrated in FIG. 3. The circuit is made up of three circuit units 20, 21 and 22 being connected in series as shown and having a negative impedance node 7 and an input node 8 for receiving voice frequency signals for coupling to a subscriber loop. The negative impedance coupling circuit in FIG. 7 is exemplary of a practical realization of the conceptual form illustrated in FIG. 4. In contrast to the circuit in FIG. 6, the negative impedance coupling circuit in FIG. 7 has been found to be more stable in a wide variety of line feed circuit tests and thus is decribed in more detail.

The negative impedance coupling circuit in FIG. 7 includes four circuit units 30, 40, 50 and 60. A series combination of circuit units 50 and 40 is coupled in parallel with the circuit unit 60 to the circuit unit 30. This is somewhat similar to the arrangement illustrated in FIG. 2f wherein the series combination of the circuit units 50 and 40 provides a function corresponding to Z2 and the circuit unit 60 provides a function corresponding to Z1. Each of the circuit units 30, 40, 50 and 60 includes circuit elements, each of which is labelled with an identifier having a respectively corresponding tens digit. Each of the identifiers having a units digit 1 designates an operational amplifier having an output and having inverting and non-inverting inputs. Each of the identifiers having a units digit 2 designates a resistor being connected between the output and the non-inverting input of the corresponding operational amplifier. Each of the identifiers having a units digit 3 designates a resistor being connected between the output and the inverting input of the corresponding operational amplifier, and each of the identifiers having a units digit 4 designates a capacitor being connected between the output and the inverting input of the correponding operational amplifier. Each of these capacitors 34, 44, 54 and 64 provide compensating negative feedback for the respective operational amplifier to prevent high frequency oscillation. The effect of these capacitors on circuit operation is otherwise substantially insignificant. In the circuit unit 30, a resistor 36 is connected between the non-inverting input of the operational amplifier 31 and a resistor 37 is connected between the inverting input and ground. In the circuit unit 40, a resistive capacitive network is provided by a resistor 45 and a capacitor 47 connected in series between the inverting input of the operational amplifier 41 and ground. The junction between the resistor 45 and the capacitor 47 is connected to the non-inverting input of the operational amplifier 51 in the circuit unit 50. Also in the circuit unit 50, a resistive capacitive network is provided by a capacitor 55 and a resistor 56 connected in series between ground and the inverting input of the operational amplifier 51. In the circuit unit 60, a resistive capacitive network is provided by a capacitor 65 and a resistor 66 connected in series between the inverting input of the operational amplifier 61 and an input node 8, corresponding to the input node 8 illustrated in FIG. 5. Resistors 28 and 29 are connected in series between ground and the non inverting inputs of the operational amplifiers 31 and 41 and provide a voltage divider having a tap at the junction of the resistors 28 and 29 which provides a negative impedance node 7, corresponding to the node 7 in FIG. 5.

In the line feed circuit illustrated in FIG. 5 a negative impedance coupling circuit 19 is provided by a circuit similar to that illustrated in either of FIGS. 6 or 7. Elements in FIG. 5 which are similar to elements in FIG. 1 have corresponding identifying labels. The negative impedance coupling circuit 19 is intended to be connected to a two wire/four wire electronic hybrid circuit (not shown) via the nodes 7 and 8 labelled Tx for transmit and Rx for receive respectively. The a.c. impedance of the electronic hybrid circuit at the node 8 is preferably near zero ohms and at the node 7 it is preferably more than ten times the absolute value of the impedance of the negative impedance coupling circuit 19, and more typically is in excess of 1 megohm. The node 7 is also connected at one of two ends of the transformer winding 10b. The other end of the transformer winding 10b is connected to an active ground circuit. The active ground circuit is not essential but tends to improve the operation of the line feed circuit when a battery connected across the power terminals 3 and 4 is used to feed many other line feed circuits in common, as is usually the practice in a typical telephone exchange. The active ground circuit includes a differential amplifier 12 connected in combination with resistors 13, 14, 17 and 18 and with capacitors 15 and 16, as shown, across the power terminals 3 and 4. The active ground circuit responds to voice band signals typically referred to as noise signals which may be present at the battery terminals, to compensate for a crosstalk effect that these noise signals would otherwise tend to have on the operation of the line feed circuit.

Zener diodes 11a and 11b in this example having Zener voltages of about 18 volts, are connected between ground and respective ends of the transformer winding 10b to protect the associated circuitry from transient surges that may from time to time occur on typical subscriber loop circuits. In one example the transformer in the a.c. coupling circuit 10 consists of about 1000 turns of 40 gauge copper wire in the winding 10a and about 500 turns of the same gauge of copper wire in the winding 10b, the windings being resident in a ferrite pot core having diameter and height dimensions of about 1.5 centimeters. Typical values of the resistive and capacitive components in the negative impedance coupling circuit illustrated in FIG. 7 for yielding the required negative impedance function in the line feed circuit illustrated in FIG. 5 are listed in the following table:

| Resistor 28 | 50 ohms |
| --- | --- |
| Resistor 29 | 1000 ohms |
| Resistor 32 | 1000 ohms |
| Resistor 33 | 86 ohms |
| Resistor 37 | 47 ohms |
| Resistor 62 | 100 ohms |
| Resistor 36 | 8.42 kilohms |
| Resistor 42 | 22 kilohms |
| Resistor 43 | 430 kilohms |
| Resistor 45 | 24 kilohms |
| Resistor 52 | 10 kilohms |
| Resistor 53 | 60.7 kilohms |
| Resistor 56 | 76.2 kilohms |
| Resistor 63 | 168 kilohms |
| Resistor 66 | 124 kilohms |
| Capacitor 34 | 68 nanofarads |
| Capacitor 55 | 10 nanofarads |
| Capacitor 47 | 0.1 microfarads |
| Capacitor 65 | 0.1 microfarads |
| Capacitor 44 | 15 picofarads |
| Capacitor 54 | 100 picofarads |
| Capacitor 64 | 33 picofarads |

Figure 8:
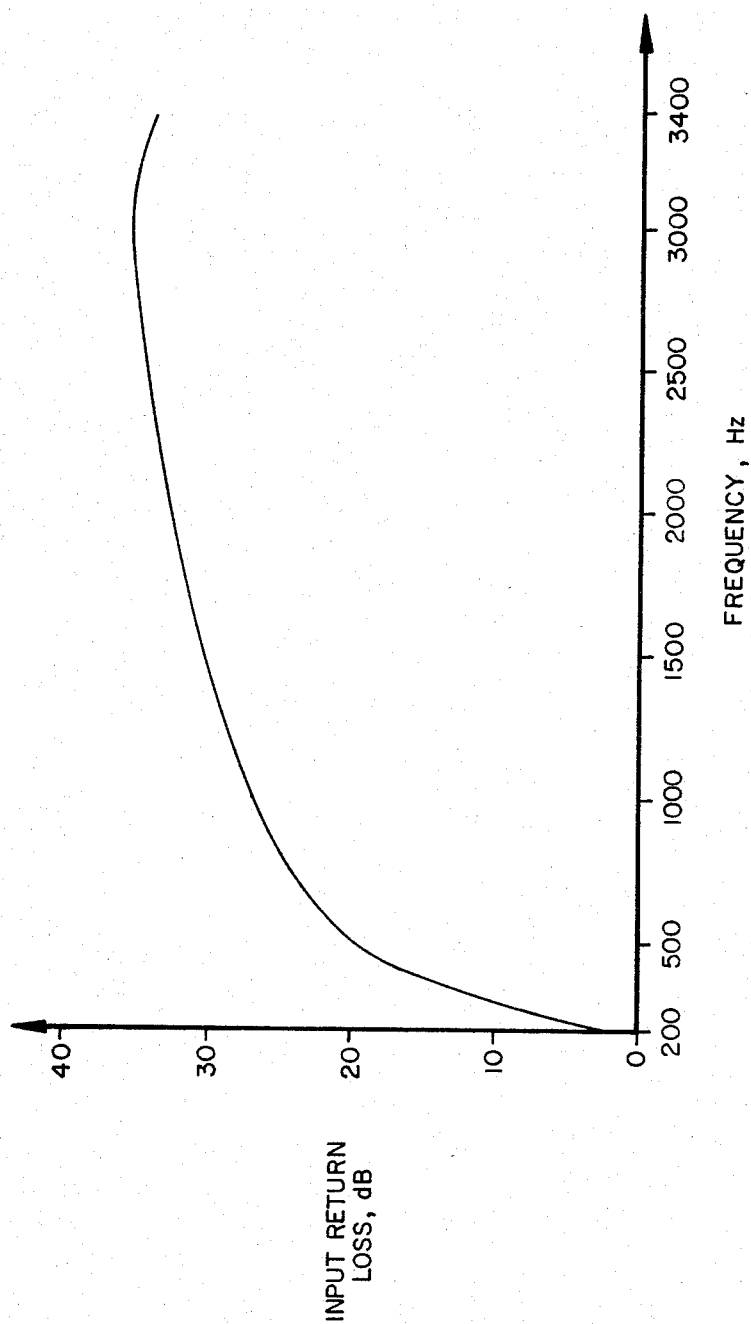
FIG. 8 is a graphical representation of a typical return loss performance of a line feed circuit in accordance with the invention.

Results of a typical voice band signal test of the line feed circuit illustrated in FIG. 5, having a negative impedance coupling circuit as illustrated in FIG. 7 are recorded in the graph of FIG. 8 where the horizontal axis represents frequency in hertz and the vertical axis represents return loss in decibels. Input return loss is typically measured using a signal source including an a.c. voltage generator connected in series with a capacitor of about 2.2 microfarads and a resistor of 900 ohms. The signal source is connected across the tip and ring terminals 1 and 2 in combination with a typical return loss measurement test apparatus, and the input node 8 is connected to ground.

What is claimed is:

1. A line feed circuit for terminating a two wire communication line comprising:
   tip and ring terminals for connection to the communication line;
   a pair of power terminals for connection across a power source;
   tip and ring resistors being connected between respective ones of the tip and ring terminals and the power terminals;
   a negative impedance coupling circuit having an impedance port including a negative impedance node, and having an input node for receiving a.c. signals for coupling to the two wire communication line via the negative impedance node;
   a direct current blocking means;
   a transformer having first and second windings in combination with a core structure, the first winding and the direct current blocking means being connected in series between the tip and ring terminals, and the second winding being connected to the impedance port.

2. A line feed circuit as defined in claim 1 wherein the impedance port consists of first and second terminals wherein the first terminal corresponds to the negative impedance node and the second terminal is connected to ground.

3. A line feed circuit as defined in claim 2 wherein said ground is provided by an a.c. grounding means.

4. A line feed circuit as defined in claim 3 wherein the a.c. grounding means comprises a differential amplifier circuit having an input a.c. coupled across the pair of power terminals, an output resistively coupled to the second winding and a feedback path resistively coupled to the second winding.

5. A line feed circuit as defined in claim 3 wherein the negative impedance coupling circuit comprises first, second and third circuit units, each circuit unit including an amplifier having an output, an inverting input being resistively connected to the output, and a non-inverting input being resistively connected to the output, the first circuit unit also including a resistive element being connected between the input node and the inverting input of its amplifier, the second circuit unit also including a resistive capacitive network being connected between the inverting input of the amplifier in the second circuit unit and the non-inverting input of the amplifier in the first circuit unit, the third circuit unit including a resistive capacitive network having a resistive element being connected between the inverting input of the amplifier in the third circuit unit and the non-inverting input of the amplifier in the second circuit unit, the non-inverting input of the amplifier in the third circuit unit corresponding to the negative impedance node, whereby the circuit units are arranged in tandem between the input node and the negative impedance node.

6. A line feed circuit as defined in claim 3 wherein the negative impedance coupling circuit comprises first, second, third and fourth circuit units, each circuit unit including an amplifier having an output, an inverting input being resistively connected to the output, and a non-inverting input being resistively connected to the output, the first circuit unit also including a resistive capacitive network being connected between the input node and the inverting input of the amplifier in the first circuit unit, the second circuit unit also including a resistive capacitive network being connected between ground and the inverting input of the amplifier in the second circuit unit, the third circuit unit also including a resistive capacitive network having a resistance element being connected between the inverting input of the amplifier in the third circuit unit and the non-inverting input of the amplifier in the second circuit unit, the inverting input of the amplifier in the fourth circuit unit being connected to the non-inverting input of the amplifier in the first circuit unit and the non-inverting input of the amplifier in the fourth circuit unit being connected to the non-inverting input of the amplifier in the third circuit unit, the negative impedance coupling circuit also including a voltage divider being connected between ground and the non-inverting input of the amplifier in the fourth circuit unit, the voltage divider including a voltage tap corresponding to the negative impedance node.

7. A line feed circuit as defined in claim 6 wherein the fourth circuit unit also comprises a resistor being connected between the non-inverting input and ground and a resistor being connected between the inverting input and ground.

8. A line feed circuit as defined in claim 1 wherein the direct current blocking means is a capacitor, the first winding and the capacitor being of such inductance and capacitance values as to be series resonant at a frequency of less than the lowest frequency in a voice band range of frequencies.

9. A line feed circuit as defined in claim 1 wherein the negative impedance coupling circuit comprises first, second and third circuit units, each circuit unit including an amplifier having an output, an inverting input being resistively connected to the output, and a non-inverting input being resistively connected to the output, the first circuit unit also including a resistive element being connected between the input node and the inverting input of its amplifier, the second circuit unit also including a resistive capacitive network being connected between the inverting input of the amplifier in the second circuit unit and the non-inverting input of the amplifier in the first circuit unit, the third circuit unit also including a resistive capacitive network having a resistive element being connected between the inverting input of the amplifier in the third circuit unit and the non-inverting input of the amplifier in the second circuit unit, the non-inverting input of the amplifier in the third circuit unit corresponding to the negative impedance node, whereby the circuit units are arranged in tandem between the input node and the negative impedance node.

10. A line feed circuit as defined in claim 1 wherein the negative impedance coupling circuit comprises first, second, third and fourth circuit units, each circuit unit including an amplifier having an output, an inverting input being resistively connected to the output, and a non-inverting input being resistively connected to the output, the first circuit unit also including a resistive capacitive network being connected between the input node and the inverting input of the operational amplifier in the first circuit unit, the second circuit unit also including a resistive capacitive network being connected between ground and the inverting input of the amplifier in the second circuit unit, the third circuit unit also including a resistive capacitive network having a resistive element being connected between the inverting input of the amplifier in the third circuit unit and the non-inverting input of the amplifier in the second circuit unit, the inverting input of the amplifier in the fourth circuit unit being connected to the non-inverting input of the amplifier in the first circuit unit and the non-inverting input of the amplifier in the fourth circuit unit being connected to the non-inverting input of the amplifier in the third circuit unit, the negative impedance coupling circuit also including a voltage divider being connected between ground and the non-inverting input of the amplifier in the fourth circuit unit, the voltage divider including a voltage tap corresponding to the negative impedance node.

11. A line feed circuit as defined in claim 10 wherein the fourth circuit unit also comprises a resistor being connected between the non-inverting input and ground and a resistor being connected between the inverting input and ground.

12. A line feed circuit for terminating a two wire communication line with a predetermined d.c. feed resistance and with a predetermined a.c. terminating impedance at a frequency in a voice band of frequencies comprising:

tip and ring termimals for connection to the communication line;
  first and second power terminals for connection to a source of energizing power;
  tip and ring resistors being connected between respective ones of the tip and ring terminals and the first and second power terminals, the tip and ring resistors being of similar ohmic values and in summation providing said predetermined d.c. feed resistance;
  a transformer having first and second windings in combination with a core structure, the first winding being connected across the tip and ring terminals;
  a capacitor being connected in series with the first winding and providing an inductive capacitive series circuit being resonant at a frequency below the voice band of frequencies;
  a negative impedance coupling circuit being connected to the second winding of the transformer for coupling a.c. signals to the communication line via the first and second windings, the negative impedance coupling circuit exhibiting a negative impedance function such that in combination with the ohmic values of the tip and ring feed resistors a positive impedance substantially corresponding to said predetermined a.c. terminating impedance is effected across the tip and ring terminals.

* * * * *